Patented June 13, 1944

2,351,263

UNITED STATES PATENT OFFICE 2,351,263

POWER TRANSMISSION

Ferris T. Harrington and Raymond C. Griffith, Detroit, Mich., and Robert A. Shartle, Rockford, Ill., assignors to Vickers Incorporated, Detroit, Mich., a corporation of Michigan Application December 30, 1939, Serial No. 311,856

1 Claim. (Cl. 121—45)

This invention relates to power transmissions and more particularly to those of the type comprising two or more fluid pressure energy translating devices, one of which may function as a pump and another as a fluid motor.

The invention more particularly relates to power transmission control systems as used in various machine tools to drive the tool or work carriages thereof. Control systems for machine tools providing the usually required rapid advance and two different feed rates of the carriage in one direction together with a rapid return movement have become standardized and are readily obtainable. Occasionally, however, a need arises for other distinct cycles of operation and accordingly it is an object of the present invention to provide a power transmission system utilizing a standard control system to produce a cycle of operation including a rapid traverse stroke in each direction and a feed stroke in each direction of travel.

Further objects and advantages of the present invention will be apparent from the following description, reference being had to the accompanying drawings wherein a preferred form of the present invention is clearly shown.

Figure 1:
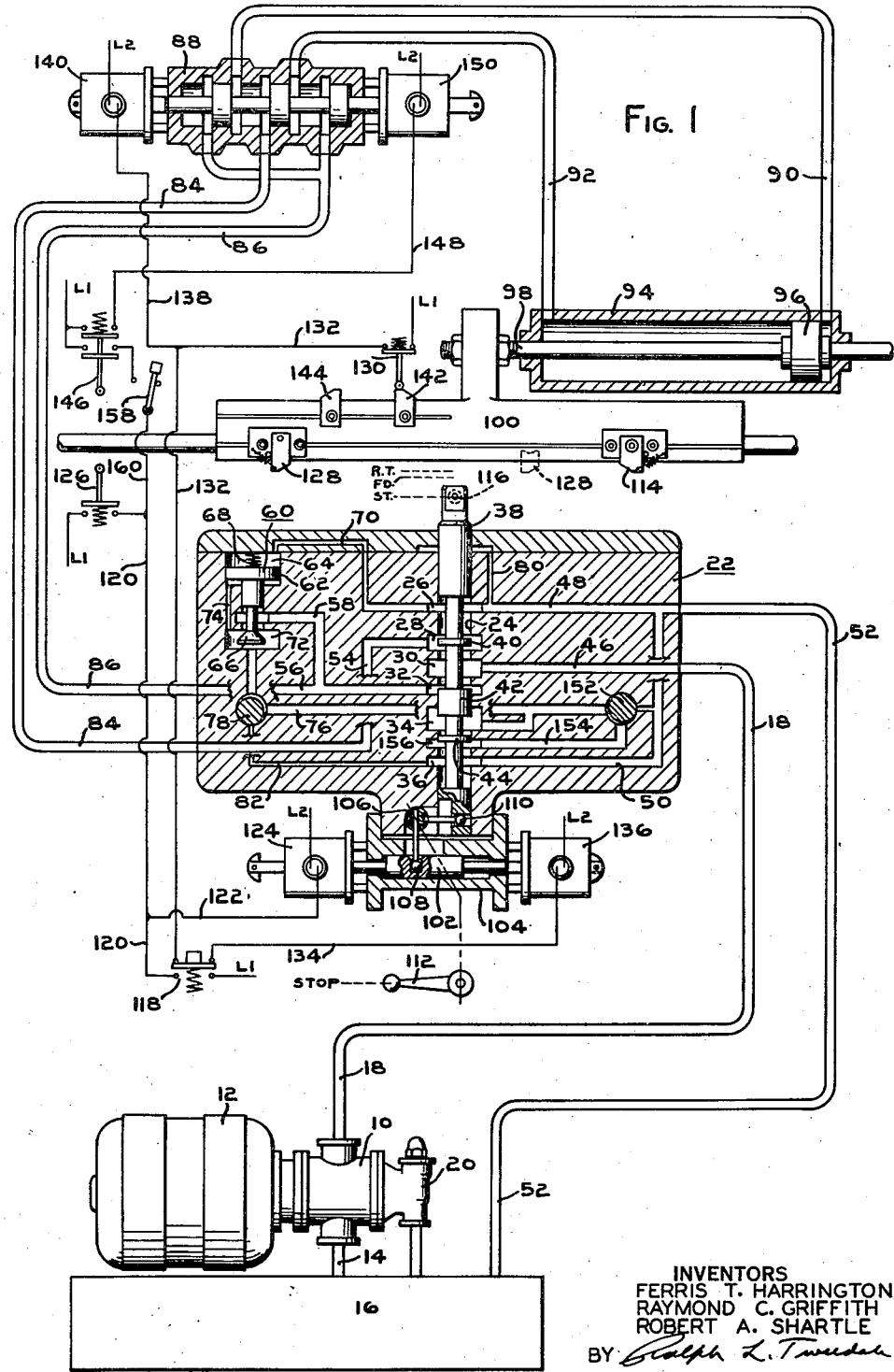
Figure 1 is a diagrammatic view of a fluid power transmission system incorporating a preferred form of the present invention.

In Figure 1 there is shown a pump 10 driven by a suitable prime mover such as an electric motor 12. The pump 10 has a suction conduit 14, through which fluid may be withdrawn from a tank 16, and a delivery conduit 18. A relief valve 20 built on the pump 10 is adapted to bypass the delivery thereof whenever the pressure at the discharge side of the pump reaches a predetermined high point.

A feed control panel generally designated at 22 has formed therein a bore 24 with annular ports 26, 28, 30, 32, 34 and 36 spaced along its length as illustrated. For the purpose of controlling fluid communication between these various ports a valve spool 38 having lands 40, 42 and 44 is reciprocably mounted in bore 24. The port 30 constitutes the pressure port and is connected by a passage 46 to the pressure conduit 18 while the two end ports 26 and 36 constitute tank ports and are connected by passages 48 and 50 respectively to a tank conduit 52 extending to the tank 16. Ports 28 and 32 have extending therefrom passages 54 and 56 respectively. A branch passage 58 connects passage 56 to a hydrostatic valve 60 the piston 62 of which is slidably mounted in a cylinder 64 and controls a poppet valve 66. A light spring 68 urges piston 62 downwardly. The upper face of piston 62 is subject to tank pressure through a passage 70 which extends to tank passage 48 through tank port 26. The lower face of piston 62 is subject to the pressure in a chamber 72, which constitutes the outlet of valve 60, through a restricted passage 74. A passage 76 extends from chamber 72 to the port 34 and has therein an adjustable throttle 78. Valve 38 and throttle 78 are provided with drain passages 80 and 82 which connect to tank passages 48 and 50 respectively. The panel 22 is a standard control panel usually utilized to provide a cycle of motor movements comprising a forward stroke at both rapid traverse and feed rates and a return stroke at rapid traverse rate only. In the present circuit the rapid traverse return position of the plunger is not utilized, the operating means, hereafter described, being arranged to shift the control plunger 38 only between its stop, feed and rapid traverse forward positions. A panel of the character described is disclosed in detail in the patent to Herman et al. No. 2,274,603 issued Feb. 24, 1942.

Passages 54 and 56 connect to conduits 84 and 86 which form the pressure and tank lines respectively of a conventional solenoid-operated, four-way, reversing valve 88. A pair of conduits 90 and 92 connect the two cylinder ports of valve 88 to the right and left ends of a cylinder 94 in which is slidably mounted a piston 96. A rod 98 of piston 96 is secured to and adapted to move a machine tool slide 100.

Three operating means are provided for shifting the valve spool 38, the first being a solenoid-actuated rod 102 mounted in a casing 104 which is secured to the bottom of panel 22 and at right angles to the spool 38. A transverse rotatable shaft 106 in panel 22 at the lower end of spool 38 has two ball-ended extensions 108 and 110 which are received respectively by the piston 102 and spool 38 in recesses formed therein. A back-and-forth movement of rod 102 will accordingly shift spool 38 up and down. The travel of rod 102 is limited to that necessary to shift the plunger 38 down only to the stop position, illustrated in Figure 1, that is, while the plunger 38 might, in its normal use, be shifted below the stop position to a rapid traverse return position, the rod 102 is arranged to prevent such movement.

A hand lever 112 secured to one end of shaft 106 provides the second means for shifting spool 38.

A cam 114, providing the third means, is adjustably mounted on slide 100 and is adapted to contact a roller 116 on the upper end of spool 38 to shift the same as will later be described. The cam 114 is preferably pivoted so as to pass freely over the roller 116 when the table moves to the right and to actuate the roller only during leftward travel.

For operation of the various solenoids an electrical circuit is provided. The normally open lower circuit of a push button starting switch 118 connects one side of the line L¹ by a conductor 120 and a branch conductor 122 to the lefthand solenoid 124, thence to the other side of the line L². The conductor 120 extends to a normally open limit switch 126, thence to line L¹. Limit switch 126 is adapted to be operated by a cam 128 adjustably mounted on slide 100 when the latter is moving to the right only. A limit switch 130 has its single circuit extend from line L¹ by a conductor 132, the normally closed upper circuit of switch 118 and a conductor 134 to the righthand solenoid 136, thence to line L². A branch conductor 138 extends from conductor 132 to the lefthand solenoid 140 of valve 88, thence to line L². The limit switch 130 is adapted to be held closed by a cam 142 adjustably mounted on slide 100 when the latter is at rest. An adjustably mounted cam 144 on slide 100 is adapted to close a double circuit limit switch 146 at the lefthand limit of its stroke. The normally open back circuit of switch 146 extends from line L¹ by a conductor 148 to the righthand solenoid 150 of valve 88. The normally open front circuit extends from line L¹ through a manually operable selector switch 158 and by a conductor 160 to conductor 120.

Figure 2:
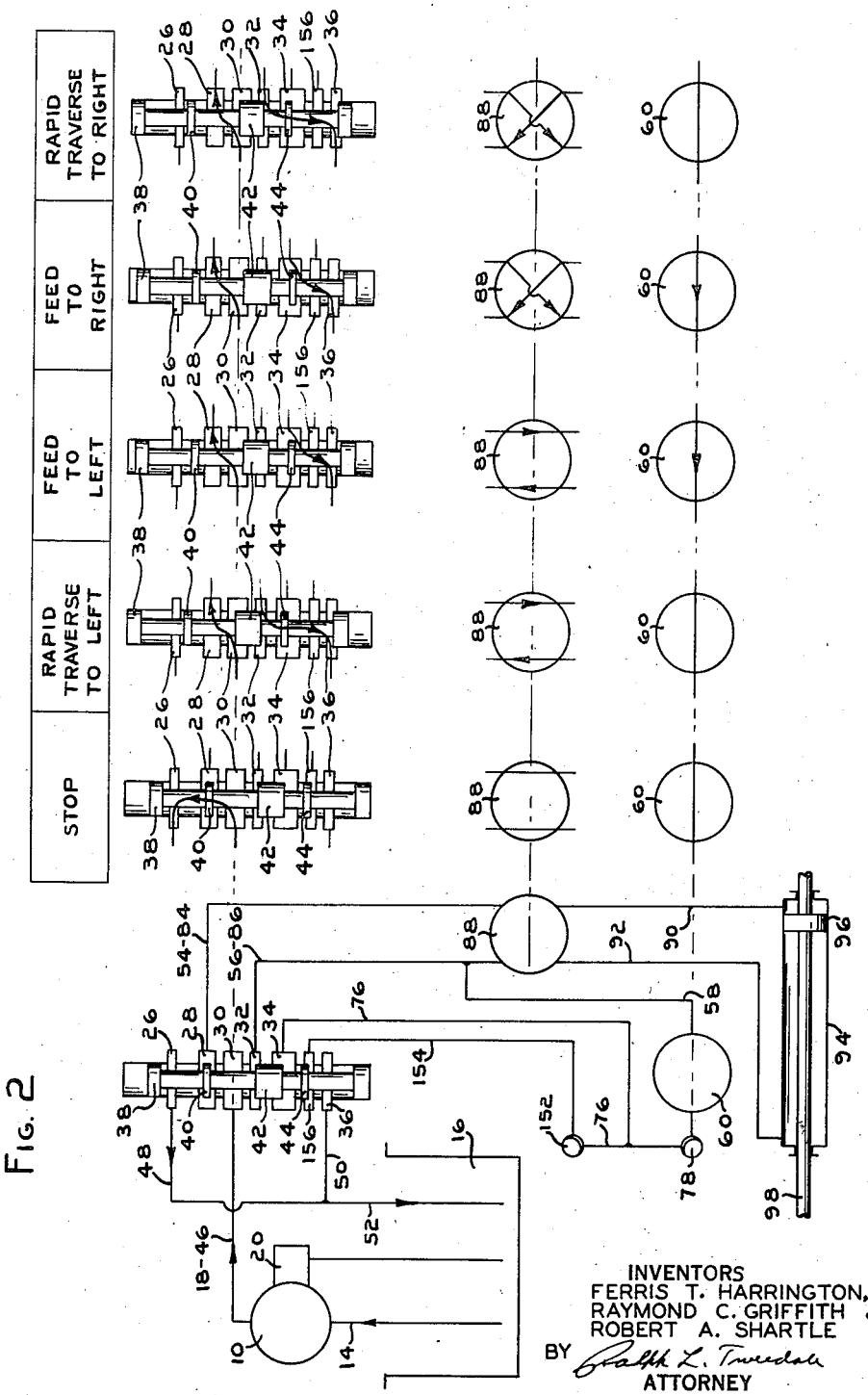
Figure 2 is a simplified showing of Figure 1 with the several valves therein shown in their various positions.

In Figure 2, the fluid flow through the several valves is shown in their different respective positions.

In operation, with the parts in the positions shown in Figure 1 and the pump 10 operating and solenoids 136 and 140 energized, fluid is withdrawn from tank 16 through conduit 14 and delivered through conduit 18 and passage 46 to the pressure port 30 in panel 22. As the land 40 of spool 38 is within port 28, fluid will pass from port 30 to port 26, through passage 48 and conduit 52 to tank. Thus, the machine is at rest with the pump delivery passing to tank.

To initiate a working cycle the push button starting switch 118 is depressed to deenergize the solenoid 136 by breaking its circuit extending from switch 130 by conductors 132 and 134. At the same time the lower circuit of switch 118 is closed to energize solenoid 124 through conductors 120 and 122. Accordingly solenoid 124 will shift rod 102 to the right causing rod 108 to rotate shaft 106 the arm 110 of which will then shift spool 38 to its uppermost or rapid traverse position (see Figure 2). Pressure fluid will then pass from port 30 through port 28, passage 54, conduit 84, valve 88 and conduit 90 to the right end of cylinder 94. Piston 96 will move to the left with rod 98 moving slide 100 likewise. Exhaust fluid from cylinder 94 will pass to tank through conduit 92, valve 88, conduit 86, passage 56, ports 32 and 36, passage 50 and conduit 52.

At this time switch 130 will ride off of cam 142 to deenergize solenoid 140 by breaking circuit 132—138. Valve 88 will, however, remain in the position illustrated. When switch 130 opens, the starting switch 118 may be released as the circuit for solenoid 136 will then be broken at switch 130. Slide 100 will move rapidly to the right until cam 114 contacts roller 116 of spool 38 thereby causing the latter to be shifted downwardly to its feed position (Figure 2). In this position pressure fluid will continue to be delivered to the right end of cylinder 94 through the same path but port 32 will be blocked by land 42 thereby directing the exhaust fluid from passage 56 through passage 58, hydrostatic valve 60, throttle 78, passage 76, ports 34 and 36, passage 50 and conduit 52 to tank. Accordingly, the exhaust fluid from cylinder 94 is metered therefrom by throttle 78 and hydrostatic valve 60 to feed the slide 100 to the left. The pump delivery over what is needed by piston 96 is blown over the relief valve 20 to tank.

When slide 100 reaches the end of its leftward travel determined by the positioning of cam 144, the latter will contact switch 146 and close it to energize solenoid 150 through conductor 148. Solenoid 150 will then shift valve 88 to reverse the fluid connections therein. As the same flow connections exist in panel 22, pressure fluid will be directed through conduit 84, valve 88 and conduit 92 to the left end of cylinder 94 causing piston 96 and slide 100 to reverse and move to the right with cam 144 riding off of switch 146. Exhaust fluid will pass from conduit 90, through valve 88 and conduit 86 to panel 22 where it will be metered, as previously described, to tank. The slide 100 accordingly feeds to the right until cam 128 contacts switch 126 to close the same thereby energizing solenoid 124 through conductors 120 and 122 to shift spool 38 again to its uppermost or rapid travers position. The fluid connections through panel 22 will be the same as when slide 100 was moving to the left in rapid traverse position, but as the valve 88 is reversed, piston 96 will now move rapidly to the right. When the cam 142 contacts switch 130 to close it, solenoid 136 will be energized through conductor 132, switch 118 and conductor 134 while solenoid 140 will be energized through conductors 132 and 138. Solenoid 136 will shift rod 102 to the left causing spool 38 to be lowered to its stop position with the pump delivery being passed to tank therethrough. Solenoid 140 will shift valve 88 to the position shown in Figure 1 in readiness for the next cycle of operation which may be repeated by again depressing switch 118.

The above description applies where the device is used for only one feed rate in addition to the rapid traverse rate. The standard control panel 22 provides in addition a second, slower, feed rate which is obtained by depressing the plunger 38 to a position just below the feed position illustrated in Figure 2. When the plunger 38 is thus depressed all of the connections are the same as for coarse feed except that oil returning from the motor through hydrostatic valve 60, throttle 78 and passage 76 cannot escape from port 34 to tank port 36 but must flow through the finer throttle 152, passage 154 and port 156 in order to reach the tank port 36. Thus the feed rate is, under these conditions, determined by the much smaller opening at throttle 152. It will be obvious to those skilled in the art that suitable additional cams may be provided for further depressing plunger 38 to obtain a finer feed at any desired point in the table travel. Likewise by the use of hook cams the plunger 38 may be lifted to coarse feed position or to rapid traverse position at any point as may be found desirable for any particular work set up.

If it is desired to have a cycle of operation wherein the rightward stroke starts at a rapid traverse rate and is later reduced to a feed rate, the selector switch 158 may be closed and the cam 128 moved to a position such as that shown by dotted lines in Figure 1 where it will not operate limit switch 126 but will, at an intermediate point in the stroke, depress the plunger 38 to feed position. Under these conditions, when the table reaches the lefthand limit of its stroke and cam 144 depresses limit switch 146, the operation is the same as before described except that in addition solenoid 124 is energized through the front circuit of switch 146, selector switch 158 and conductors 160, 120 and 122. Thus the plunger 38 is lifted to rapid traverse position at the start of the rightward stroke and remains in this position until depressed to feed position by the cam 128. The arrangement is thus completely flexible to provide any desired speed cycle in one direction of table travel and to provide an identical or different speed cycle in the opposite direction.

If an emergency arises and it is desired to stop the slide 100 in whatever position it may be, the hand lever 112 may be rotated clockwise to shift spool 38 downwardly to its stop position. The pump 10 will then be unloaded and the slide 100 will stop.

While the form of embodiment of the invention as herein disclosed constitutes a preferred form, it is to be understood that other forms might be adopted, all coming within the scope of the claim which follows.

What is claimed is as follows:

In a hydraulic power transmission system the combination with means forming a source of pressure fluid, fluid motor means connected to the source for operation thereby, a standard control panel connected between the motor and source and of the type having a control member normally shiftable between at least four positions providing rapid traverse forward, feed forward and rapid traverse reverse movement of the motor with a motor stopping position intermediate the forward and reverse positions, a reverse valve connected in series with the control panel, and operating means for the panel and reverse valve and controlled by the motor, said operating means acting to shift the panel control member in opposite directions only as far as the forward and stop positions, respectively, and to shift the reverse valve in sequence to produce a cycle of motor travel including rapid traverse and feed strokes in each direction.

FERRIS T. HARRINGTON.
RAYMOND C. GRIFFITH.
ROBERT A. SHARTLE.